(12) United States Patent
Tewksbury et al.

(10) Patent No.: US 10,245,777 B2
(45) Date of Patent: Apr. 2, 2019

(54) GUSSET BOARD WITH COLLAPSIBLE NOSE

(71) Applicant: Pearl Technologies, Inc., Savannah, NY (US)

(72) Inventors: Robert J. Tewksbury, Geneva, NY (US); Laurent Cros, Gloucester, MA (US); Gary Peacock, Rowley, MA (US)

(73) Assignee: Pearl Technologies, Inc., Savannah, NY (US)

( * ) Notice: Subject to any disclaimer, the term of this patent is extended or adjusted under 35 U.S.C. 154(b) by 371 days.

(21) Appl. No.: 15/074,550

(22) Filed: Mar. 18, 2016

(65) Prior Publication Data

US 2016/0271863 A1    Sep. 22, 2016

Related U.S. Application Data

(60) Provisional application No. 62/135,404, filed on Mar. 19, 2015.

(51) Int. Cl.
| | | |
|---|---|---|
| *B29C 53/10* | (2006.01) | |
| *B29C 55/28* | (2006.01) | |
| *B29L 31/00* | (2006.01) | |

(52) U.S. Cl.
CPC .............. *B29C 53/10* (2013.01); *B29C 55/28* (2013.01); *B29L 2031/7128* (2013.01)

(58) Field of Classification Search
CPC ......... B29C 53/10; B29C 55/28; B65H 45/08; B65H 45/221; B65H 45/223
USPC ........................................................ 493/439
See application file for complete search history.

(56) References Cited

U.S. PATENT DOCUMENTS

| | | | | | |
|---|---|---|---|---|---|
| 2,961,930 | A | * | 11/1960 | Wamsley | B31B 70/00 493/439 |
| 3,566,756 | A | * | 3/1971 | Schmid | B29C 53/10 493/439 |
| 4,068,999 | A | * | 1/1978 | Dawson | B29C 53/10 264/564 |
| 4,650,406 | A | * | 3/1987 | Peters | B29C 53/10 264/40.5 |
| 4,931,033 | A | * | 6/1990 | Leeds | B31B 70/00 383/10 |
| 8,776,484 | B2 | * | 7/2014 | Kondo | B65B 9/2028 493/243 |
| 9,724,867 | B2 | * | 8/2017 | Oberdalhoff | B29C 47/0026 |

(Continued)

FOREIGN PATENT DOCUMENTS

GB          555399 A  *  8/1943  .......... B65H 45/223

*Primary Examiner* — Thanh Truong
*Assistant Examiner* — Patrick Fry
(74) *Attorney, Agent, or Firm* — Joseph M. Rolnicki; Evans & Dixon, L.L.C.

(57) ABSTRACT

Gusset boards of a blown film extrusion apparatus have nose portions that can be positioned in the path of a tube of blown film traveling between the nose portions where the nose portions engage with opposite sides of the tube of blown film and form gussets in the tube of blown film. The nose portions of the gusset boards can also reduce their width dimensions which enables the nose portions to be moved away from the path of blown film traveling between the gusset boards when gussets formed in the opposite sides of the tube of blown film are not needed.

18 Claims, 5 Drawing Sheets

(56) References Cited

U.S. PATENT DOCUMENTS

| | | | |
|---|---|---|---|
| 2004/0184682 A1* | 9/2004 | Lovold | B65D 33/007 383/120 |
| 2014/0066279 A1* | 3/2014 | Butty | B65H 45/08 493/405 |

* cited by examiner

GUSSET BOARD WITH COLLAPSIBLE NOSE

This application claims the benefit of the filing date of provisional Application No. 62/135,404.

FIELD

This application pertains to improvements to gusset boards of a blown film extrusion apparatus. More specifically, this application pertains to gusset boards having nose portions that can be positioned in the path of a tube of blown film traveling between the nose portions where the nose portions engage with opposite sides of the tube of blown film and form gussets in the tube of blown film. The nose portions of the gusset boards can also reduce their width dimensions which enables the nose portions to be moved away from the path of blown film traveling between the gusset boards when gussets formed in the opposite sides of the tube of blown film are not needed.

BACKGROUND

Figure 1:
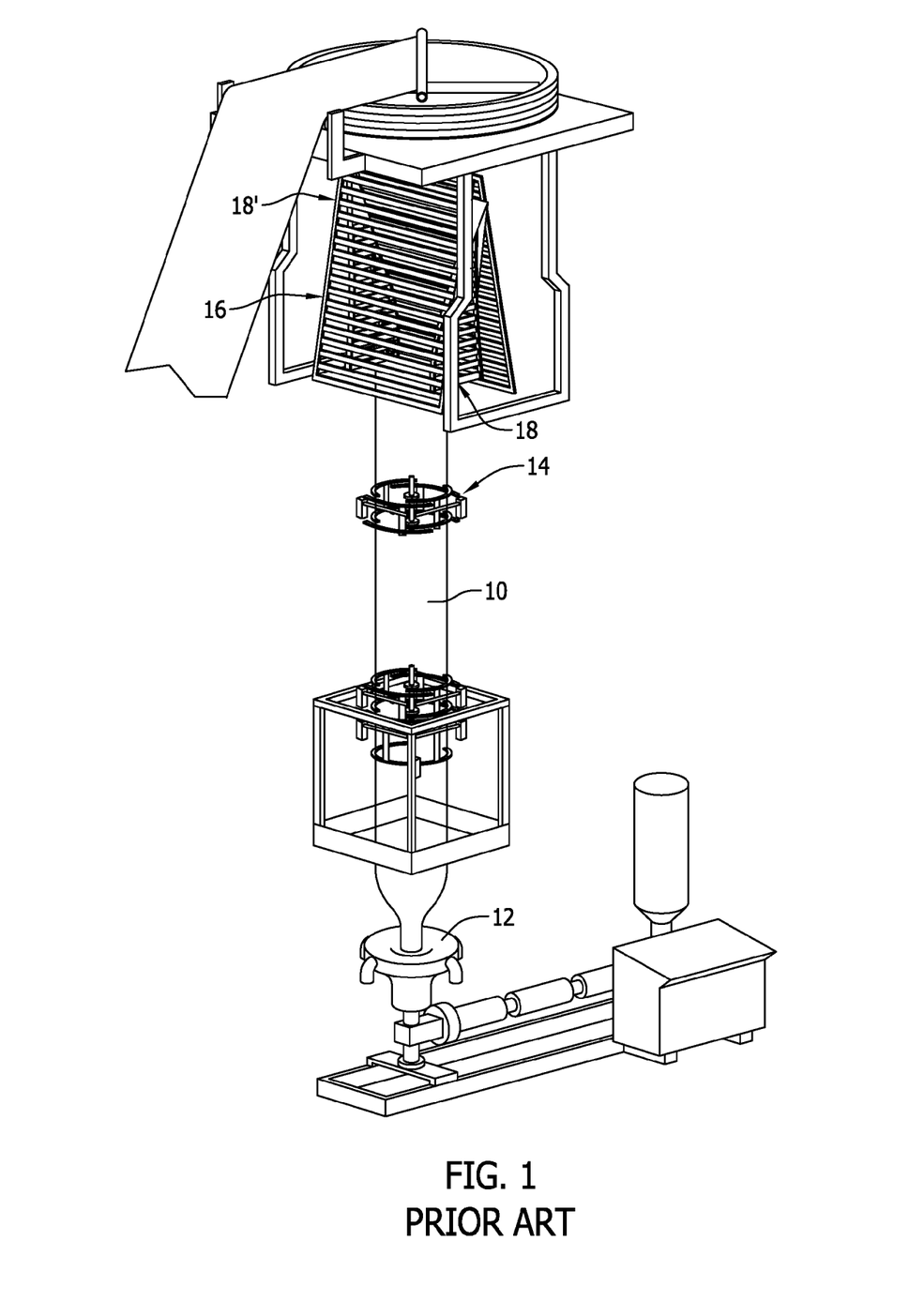
FIG. 1 is a representation of a blown film extrusion process.

FIG. 1 is a representation of an apparatus that manufactures plastic film for products such as plastic shopping bags by a blown film extrusion process. A similar apparatus is disclosed in the U.S. Patent of Tewksbury et al., U.S. Pat. No. 9,044,896, which is assigned to the Assignee of this application and is incorporated herein by reference. In the process a hot plastic melt is blown as a tubular bubble 10 from an extrusion die 12. The tubular bubble 10 is blown upwardly through a bubble guide 14 to a collapsing frame 16. In the collapsing frame 16 the bubble 10 is folded flat. The flat folded bubble then passes over turning bars and continues on from the collapsing frame 16 for further processing.

Figure 2:
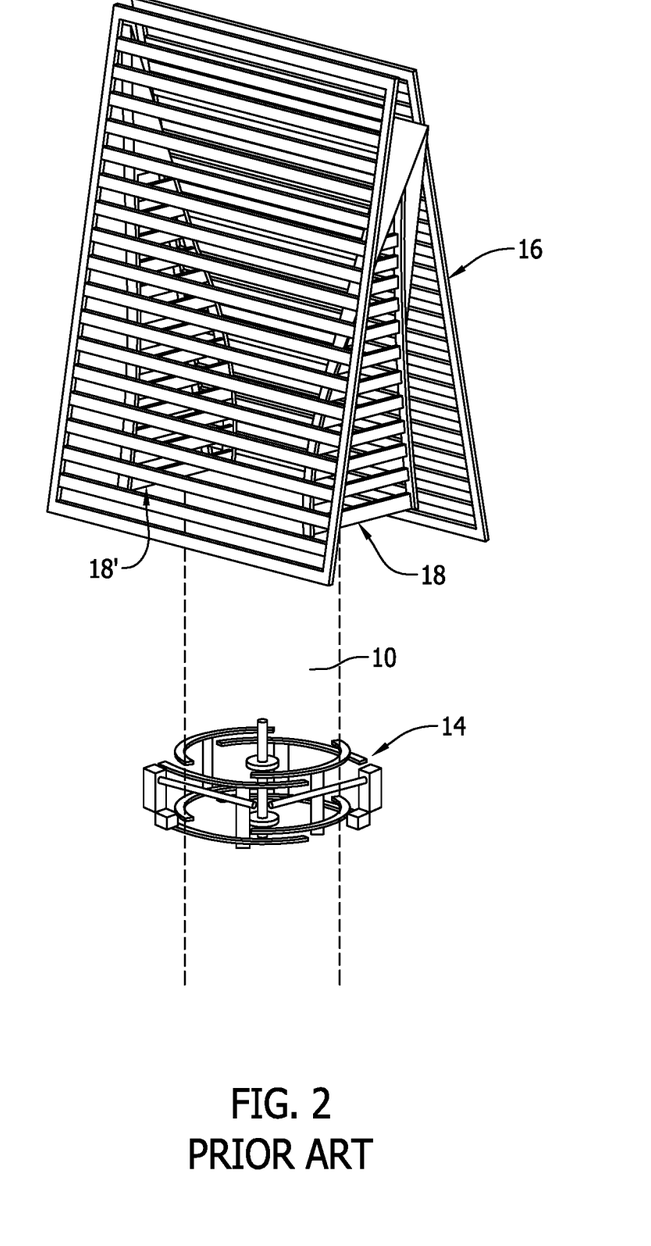
FIG. 2 is an enlarged view of a collapsing frame of the blown film extrusion process represented in FIG. 1.
Figure 3:
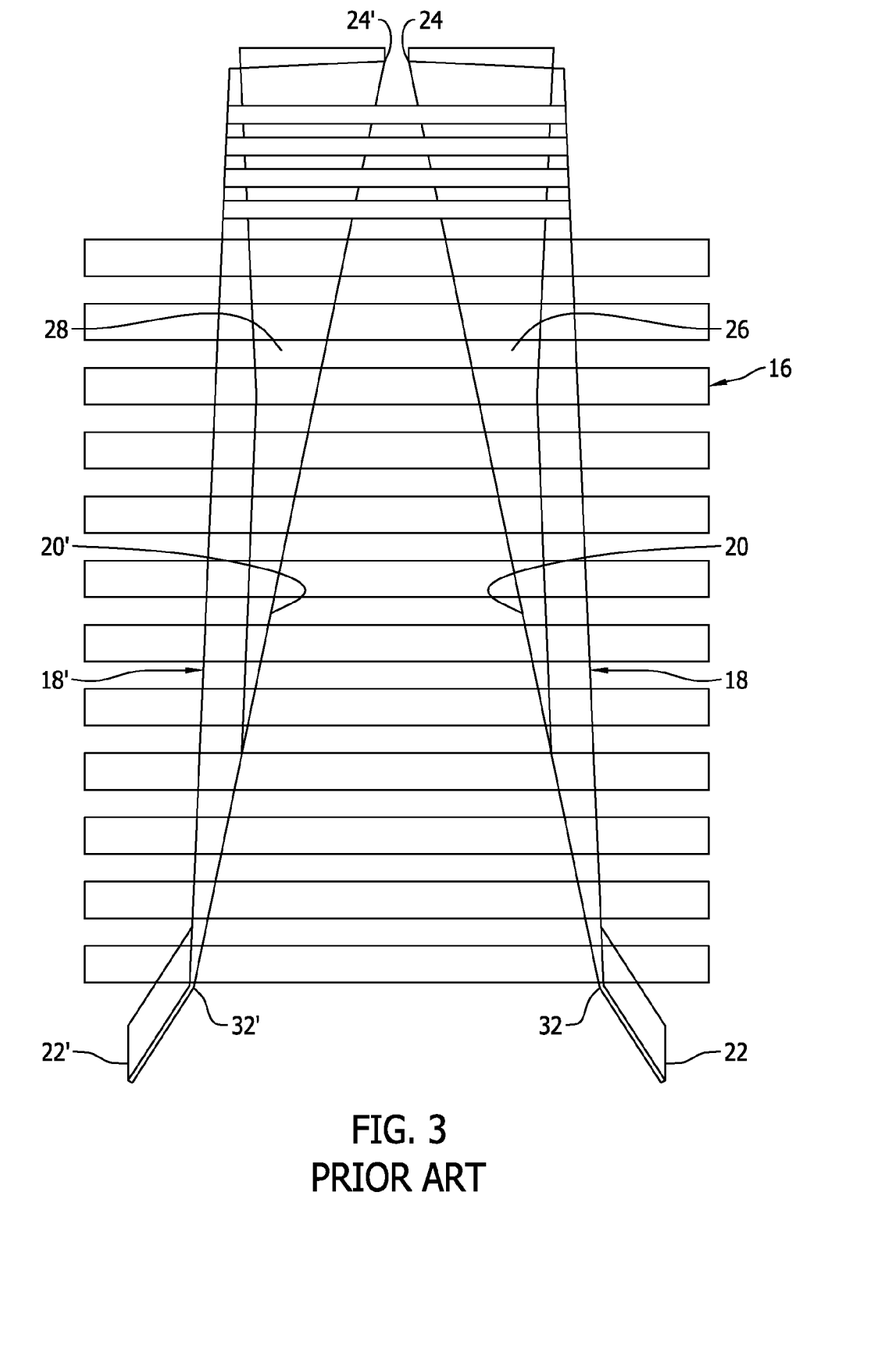
FIG. 3 is a representation of a pair of gusset boards in the collapsing frame of FIG. 2.

FIG. 2 is an enlarged view of the collapsing frame 16. In the collapsing frame 16, the bubble 10 can be folded flat, or can be folded with gussets on the opposite sides of the bubble. The gussets are folded into the opposite sides of the bubble 10 by a pair of opposing gusset boards 18, 18'. The gusset boards 18, 18' press the opposite sides of the bubble 10 inwardly as the bubble moves upwardly through the collapsing frame. This is represented in FIG. 3. In FIGS. 2 and 3 it can be seen that each of the gusset boards 18, 18' are mirror images of each other. Therefore, only the one gusset board 18 to the right in FIGS. 2 and 3 will be described.

In FIGS. 2 and 3 it can be seen that the gusset board 18 has an elongate triangular sliding surface 20 that extends from a base edge 22 of the gusset board upwardly to an apex 24 of the gusset board. The sliding surface 20 faces toward the bubble 10 and engages the bubble 10 in sliding contact as the bubble moves upwardly through the collapsing frame 16. The gusset board 18 also has a pair of fold surfaces 26, 28 that extend upwardly along the opposite edges of the sliding surface 20. When the gusset board 18 is positioned in the collapsing frame 16 as represented in FIG. 3, as the bubble 10 moves upwardly the gusset board sliding surface 20 presses in on the side of the bubble and portions of the bubble are folded over the two fold surfaces 26, 28. This forms a gusset fold in the side of the bubble 10. In this manner, the pair of gusset boards 18, 18' form gusset folds in the opposite sides of the bubble 10 as the bubble moves upwardly through the collapsing frame.

If gusset folds are not needed in the opposite sides of the bubble 10, then the gusset boards 18, 18' are moved in the collapsing frame 16 to retracted positions away from the bubble 10. In FIG. 2, the gusset boards 18, 18' are shown in their retracted positions relative to the collapsing frame 16. In these positions of the gusset boards 18, 18' they guide the tubular bubble 10 upwardly and center the bubble 10 relative to the frame 16. In the positions of the gusset boards 18, 18' shown in FIG. 2, the boards merely guide the tubular bubble 10 upwardly as the bubble is gradually flattened by the collapsing frame 16. The gusset boards 18, 18' do not fold in the opposite sides of the tubular bubble 10.

Problems can be encountered in blown film extrusion apparatus such as that shown in FIG. 1 when the bubble 10 is desired to be folded flat without gussets. When the blown bubble 10 is not being folded with gussets, the gusset boards 18, 18' have to be retracted or the board apexes 24, 24' need to be moved away from each other to enable the full width of the bubble 10 to pass between the gusset boards 18, 18' without being contacted by the boards. However, in almost all current blown film extrusion apparatus, there are obstructions that prevent the gusset boards 18, 18' from moving away from each other. Obstacles like the supporting structures of the collapsing frame 16 prevent the gusset boards 18, 18' from being separated completely from each other. In referring to FIG. 3, it can be seen that if the two gusset boards 18, 18' were pivoted away from each other at pivot connections 32, 32' the outward edges of the fold surfaces 26, 26', 28, 28' would engage against supporting structures of the collapsing frame 16. This would prevent the sliding surfaces 20, 20' of the gusset boards 18, 18' from being completely pivoted away from each other to where the sliding surfaces 20, 20' are parallel and do not obstruct the movement of the bubble 10 upwardly through the collapsing frame 16. In current practice, blown film extrusion apparatus are either constructed to extrude the tubular bubble 10 that will be folded flat exclusively, or are constructed to fold gussets into the opposite sides of the tubular bubble 10.

Additionally, some film producers have purchased gusset boards 18, 18' and have installed them on their blown film extrusion apparatus when they needed them, and removed the gusset boards 18, 18' when they weren't needed. This is a laborious task that takes up to a day to remove the gusset boards, causing a significant drop in production capacity and efficiency throughout the course of a year. This has led to the development of the collapsible gusset board nose of this disclosure.

SUMMARY

The gusset boards of this disclosure are configured to fold gussets in opposite sides of a tube of film as the tube of film moves past the gusset boards. The gusset boards of this disclosure are also configured to partially move away from the tube of film moving past the gusset boards and not fold gussets into the opposite sides of tube of film.

The gusset boards are mirror images of each other. Therefore, only one of the gusset boards is described here. It should be understood that the opposite gusset board on the opposite side of the tube of film moving between the two gusset boards has the same construction as the described gusset board.

The gusset board has a base portion. A base sliding surface is provided on the base portion. The base sliding surface is fixed stationary on the gusset board. The base sliding surface has a general configuration of a truncated cone with a top edge.

The gusset board has a nose portion. A nose sliding surface is provided on the nose portion. The nose sliding surface has a general triangular configuration with a base edge at the bottom of the nose sliding surface and an apex end at the top of the nose sliding surface. The base edge of the nose sliding surface is connected to the top edge of the base portion of the gusset board for movement of the nose sliding surface between a first position of the nose sliding surface relative to the base sliding surface and a second position of the nose sliding surface relative to the base sliding surface. In the first position of the nose sliding surface relative to the base sliding surface, the nose sliding surface and the base sliding surface are positioned in substantially a same plane. In the second position of the nose sliding surface relative to the base sliding surface, the nose sliding surface is positioned away from the plane of the base sliding surface. Furthermore, in the second position of the nose sliding surface relative to the base sliding surface, the nose sliding surface is positioned at an angle relative to the base sliding surface.

A pivot connection connects the nose portion of the gusset board to the base portion of the gusset board. The pivot connection enables the nose sliding surface to move between its first and second positions relative to the base sliding surface.

The nose portion of the gusset board has a rear surface opposite the nose sliding surface. A nose mast is secured to the rear surface of the nose portion adjacent the apex end of the nose sliding surface. The nose mast is moveable between first and second positions. In the first position the nose mast extends straight out from the rear surface of the nose portion. In the second position, the nose mast is moved toward the rear surface of the nose portion and extends along the rear surface of the nose portion.

A pair of side panels are connected to the nose mast. The side panels are flexible and have general triangular configurations. A first of the side panels is connected to the length of the nose mast and a first side edge of the nose portion of the gusset board. A second of the side panels is connected to the length of the nose mast and a second side edge of the nose portion of the gusset board.

An actuator is connected between the nose mast and the rear surface of the nose portion of the gusset board. The actuator is selectively operable to move the mast between its first and second positions relative to the rear surface of the nose portion of the gusset board. When the actuator is operated to move the mast to its first position relative to the nose portion of the gusset board, the mast extends straight out from the rear surface of the nose portion of the gusset board and the first and second panels are extended and form planar surfaces between opposite sides of the nose mast and the opposite side edges of the nose portion of the gusset board. The extended first and second side panels form fold surfaces that guide the tube of film over opposite sides of the nose sliding surface when the nose portion of a gusset board is folding a gusset in a side of the tube of film moving past the gusset board.

When the actuator moves the mast to its second position relative to the rear surface of the nose portion of the gusset board, the first and second side panels are moved downwardly toward the rear surface of the nose portion of the gusset board to collapsed positions of the side panels. With the side panels moved to their collapsed positions, they are no longer an obstruction that would prevent the nose portion of the gusset board from moving from its first position relative to the base portion of the gusset board to its second position relative to the base portion of the gusset board. With the nose sliding surface of the nose portion of the gusset board moved to its second position relative to the base portion of the gusset board, sufficient clearance is provided between the opposing gusset boards to enable the tube of film to pass between the gusset boards without a gusset being formed in the opposite sides of the tube of film.

BRIEF DESCRIPTION OF THE DRAWINGS

Further features of the gusset board with collapsible nose of this disclosure are set forth in the following detailed description of the gusset board and the drawing figures.

DESCRIPTION

The gusset boards are mirror images of each other. Therefore, only one of the gusset boards is described here. It should be understood that the opposite gusset board on the opposite side of the tube of film moving between the two gusset boards has the same construction as the described gusset board.

Figure 4:
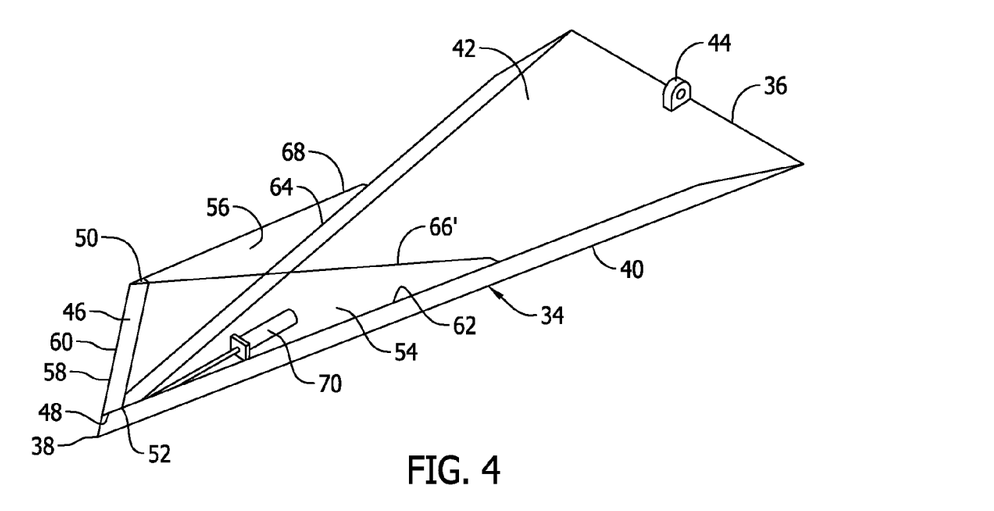
FIG. 4 is a representation of the rear of the gusset board with a collapsible nose portion of this disclosure with the mast of the nose portion extended to its first position.
Figure 5:
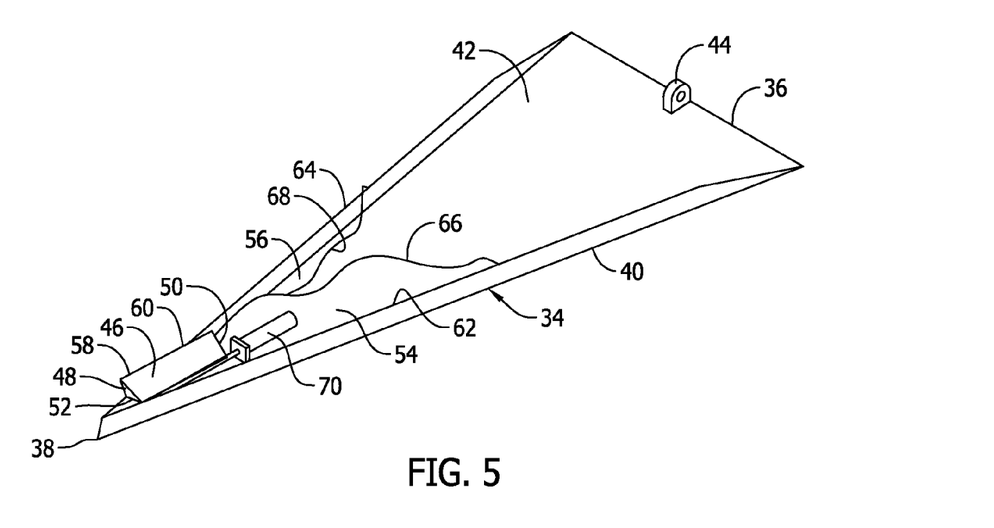
FIG. 5 is a representation of the rear of the gusset board with a collapsible nose portion of this disclosure with the mast moved to its collapsed, second position relative to the nose portion.
Figure 6:
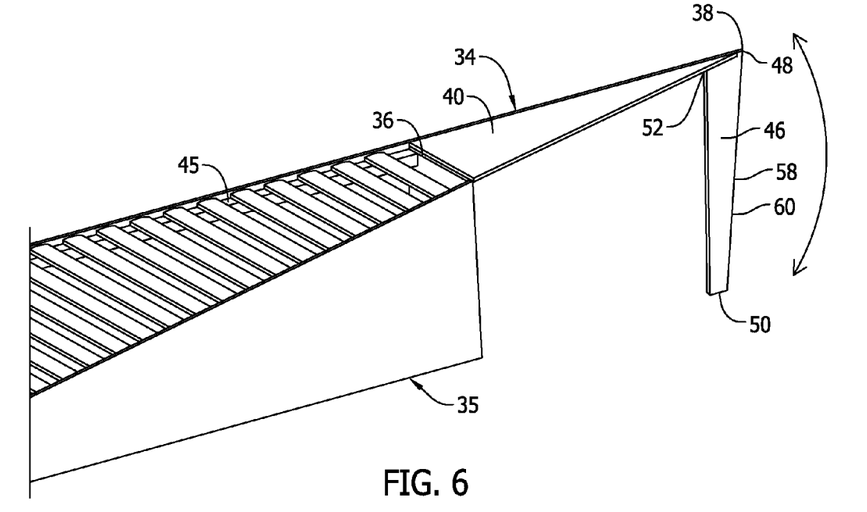
FIG. 6 is a representation of the gusset board with a collapsible nose portion attached to a base portion of the gusset board and with the mast in its extended, first position relative to the nose portion of the gusset board. The first and second side panels that form the folding surfaces are not shown in FIG. 6.
Figure 7:
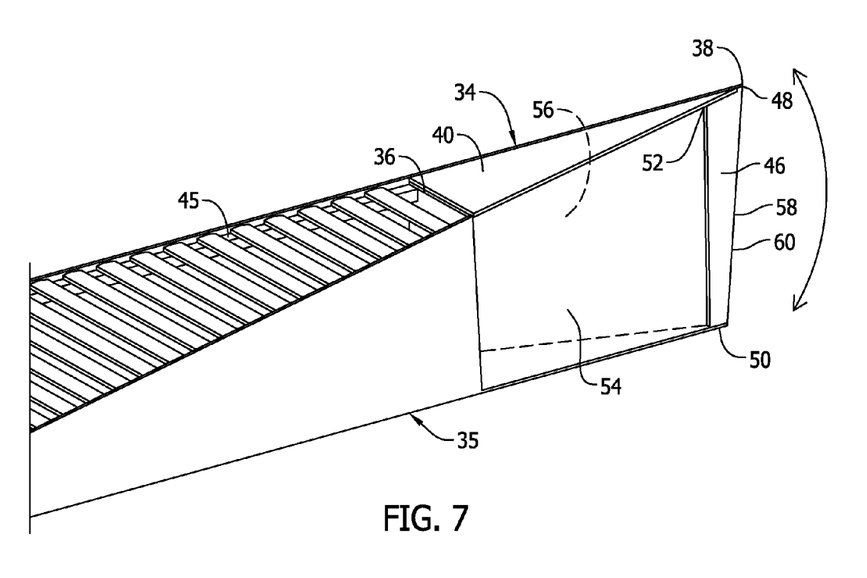
FIG. 7 is a representation of the gusset board with a collapsible nose portion attached to the base portion of the gusset board with the mast and the first and second side panels moved to their extended, second positions relative to the nose portion of the gusset board.

FIGS. 4 and 5 show the collapsible gusset board nose portion 34 of this disclosure. FIGS. 6 and 7 show the collapsible gusset board nose portion 34 attached to a base portion 35 of a gusset board.

The collapsible gusset board nose portion 34 has a conventional triangular configuration of an apex end of a gusset board. The nose portion 34 extends from a base edge 36 at one end of the nose portion 34 to the opposite apex end 38 of the nose portion. The nose portion 34 also has the elongate triangular configuration on its front sliding surface 40 and its opposite rear surface 42.

Referring to FIGS. 4 and 5, the nose portion 34 has a pivot connection 44 on its rear surface 42 adjacent the base edge 36. The pivot connection 44 connects the nose portion 34 to a top edge of the base portion 35 of the gusset board as represented in FIGS. 6 and 7. The pivot connection 44 also enables pivoting of the nose portion 34 about the pivot connection 44 between a first, extended position of the nose portion 34 represented in FIGS. 6 and 7 where the nose sliding surface 40 of the nose portion 34 is positioned substantially in a same plane as a sliding surface 45 of the base portion 35 to form gussets in a side of a tubular bubble, and a second, retracted position of the nose portion 34 where the nose portion 34 is pivoted away from and at an angle to the sliding surface 45 of the base portion 35 as represented by the arrows in FIGS. 6 and 7. In the retracted position the nose portion 34 will not engage with the tubular bubble 10 to fold a gusset in the side of the bubble.

To provide clearance for the pivoting movement of the gusset board nose portion 34 to its retracted position, a nose mast 46 is secured to the nose portion rear surface 42 at the apex end 38 of the nose. The nose mast 46 shown in FIGS. 4 and 5 has a general triangular cross-section configuration and a length between a first, proximal end 48 of the mast and a second, distal end 50 of the mast.

The mast first end 48 is secured to the nose rear surface 42 adjacent the apex end 38 by a pivoting connection 52. The pivoting connection 52 enables the nose mast 46 length to pivot between a first, extended position represented in FIG. 4, and a second, collapsed position represented in FIG. 5.

A pair of flexible side panels 54, 56 are connected to the nose mast 46. The side panels can be constructed of a fabric, of plastic, or other equivalent materials. As shown in FIGS. 4 and 5, each of the flexible side panels 54, 56 has a first edge, 58, 60 connected along the nose mast 46, a second edge 62, 64 connected to the opposite side edges of the nose portion 34 and an opposite free edge 66, 68 that extends from the second, distal end 50 of the nose mast 46 to the side edges of the nose portion 34.

A linear actuator 70 is connected to the nose mast 46 and the rear surface 42 of the nose portion 34. In the example shown in FIGS. 4 and 5, the linear actuator 70 is a pneumatic actuator. However, other equivalent types of linear actuators could be used as the linear actuator 70 represented in FIGS. 4 and 5. When the linear actuator 70 is controlled to move to its extended condition, the actuator 70 pivots the nose mast 46 to its first, extended position represented in FIGS. 4, 6 and 7. When the linear actuator 70 is controlled to move to its contracted position, the linear actuator 70 pulls the nose mast 46 back to its second, collapsed position represented in FIG. 5 where the mast 46 extends along the rear surface 42 of the nose portion 34.

With the nose mast 46 moved to its collapsed position represented in FIG. 5, the two flexible side panels 54, 56 are moved toward the rear surface 42 of the nose portion 34. With the side panels 54, 56 moved to their collapsed positions represented in FIG. 5, they are no longer an obstruction that would prevent the gusset board nose portion 34 from moving from its first position in the collapsing frame 16 where the nose portion 34 sliding surface 40 would engage with a side of the tubular bubble 10 and form a gusset in the tubular bubble, to the second position of the nose portion 34 represented by the arrows in FIGS. 6 and 7 where the nose portion is moved away from the tubular bubble 10 passing through the collapsing frame 16.

In the above manner, the collapsible gusset board nose portion 34 can be moved away from its gusset forming position providing a clear path through the collapsing frame 16 for the tubular bubble 10 without disassembling the gusset boards 18, 18' from the collapsible frame 16.

As various modifications could be made in the construction of the apparatus and its method of operation herein described and illustrated without departing from the scope of the invention, it is intended that all matter contained in the foregoing description or shown in the accompanying drawings shall be interpreted as illustrative rather than limiting. Thus, the breadth and scope of the present disclosure should not be limited by any of the above described exemplary embodiments, but should be defined only in accordance with the following claims appended hereto and their equivalents.

The invention claimed is:

1. A gusset board configured to fold a gusset in a tube of film, the gusset board comprising:
   a base portion of the gusset board;
   a base sliding surface on the base portion, the base sliding surface being fixed stationary on the gusset board;
   a nose portion of the gusset board;
   a nose sliding surface on the nose portion of the gusset board, the nose sliding surface is positioned in substantially a same plane as the base sliding surface, the nose sliding surface having a general triangular configuration with a base edge and an opposite apex end;
   the nose portion of the gusset board having a rear surface on an opposite side of the nose portion of the gusset board from the nose sliding surface; and,
   a mast having a length with opposite proximal and distal ends, the proximal end of the mast being connected to the rear surface of the nose portion of the gusset board at the apex end of the nose sliding surface, the mast being configured to be moved between a first position of the mast relative to the rear surface of the nose portion of the gusset board where the mast extends outwardly from the rear surface of the nose portion of the gusset board and a second position of the mast relative to the rear surface of the nose portion of the gusset board where the mast extends along the rear surface of the nose portion of the gusset board.

2. The gusset board of claim 1, further comprising:
   the nose sliding surface being connected to the base portion of the gusset board for moving between a first position of the nose sliding surface relative to the base portion of the gusset board where the nose sliding surface is positioned in substantially the same plane as the base sliding surface and a second position of the nose sliding surface relative to the base portion of the gusset board where the nose sliding surface is positioned at an angle relative to the base sliding surface.

3. The gusset board of claim 2, further comprising:
   the nose sliding surface is connected to the base portion of the gusset board by a pivot connection that enables the nose sliding surface to pivot between the first position of the nose sliding surface relative to the base portion of the gusset board and the second position of the nose sliding surface relative to the base portion of the gusset board.

4. The gusset board of claim 1, further comprising:
   the nose sliding surface being connected to the base portion of the gusset board with the base edge of the nose sliding surface positioned adjacent the base sliding surface.

5. The gusset board of claim 1, further comprising:
   a first panel connected between the mast and a first side edge of the nose portion of the gusset board;
   a second panel connected between the mast and a second side edge of the nose portion of the gusset board;
   the first panel being configured to be moved between a first position of the first panel relative to the rear surface of the nose portion of the gusset board in response to the mast moving to the first position of the mast relative to the rear surface of the nose portion of the gusset board wherein in the first position the first panel extends outwardly from the rear surface of the nose portion of the gusset board, and a second position of the first panel relative to the rear surface of the nose portion of the gusset board in response to the mast moving to the second position of the mast relative to the rear surface of the nose portion of the gusset board wherein in the second position the first panel extends along the rear surface of the nose portion of the gusset board; and, the second panel being moveable between a first position of the second panel relative to the rear surface of the nose portion of the gusset board in response to the mast moving to the first position of the mast relative to the rear surface of the nose portion of the gusset board wherein in the first position the second panel extends outwardly from the rear surface of the nose portion of the gusset board, and a second position of the second panel relative to the rear surface of the nose portion of the gusset board in response to the mast moving to the second position of the mast relative to the rear surface of the nose portion of the gusset board wherein in the second position the second panel extends along the rear surface of the nose portion of the gusset board.

6. The gusset board of claim 5, further comprising:
the first panel and the second panel being constructed of flexible material.

7. The gusset board of claim 6, further comprising:
in the first position of the mast relative to the rear surface of the nose portion of the gusset board and in the first positions of the first panel and the second panel relative to the rear surface of the nose portion of the gusset board the mast pulls the first panel and the second panel tight from the respective first side edge and second side edge of the nose portion of the gusset board.

8. A gusset board configured to fold a gusset in a tube of film, the gusset board comprising:
a base portion of the gusset board;
a base sliding surface on the base portion, the base sliding surface being fixed stationary on the gusset board;
a nose portion of the gusset board;
a nose sliding surface on the nose portion of the gusset board, the nose sliding surface having a general triangular configuration with a base edge and an opposite apex end, the nose sliding surface being connected to the base portion of the gusset board for moving between a first position of the nose sliding surface relative to the base portion of the gusset board where the nose sliding surface is positioned in substantially a same plane as the base sliding surface and a second position of the nose sliding surface relative to the base portion of the gusset board where the nose sliding surface is positioned at an angle relative to the base sliding surface;
the nose portion of the gusset board having a rear surface on an opposite side of the nose portion of the gusset board from the nose sliding surface;
a mast connected to the rear surface of the nose portion of the gusset board, the mast being configured to be moved between a first position of the mast relative to the rear surface of the nose portion of the gusset board and a second position of the mast relative to the rear surface of the nose portion of the gusset board, wherein in the first position of the mast relative to the rear surface of the nose portion of the gusset board the mast extends outwardly from the rear surface of the nose portion of the gusset board, and in the second position of the mast relative to the rear surface of the nose portion of the gusset board the mast extends along the rear surface of the nose portion of the gusset board;
a first panel connected between the mast and a first side edge of the nose portion of the gusset board;
a second panel connected between the mast and a second side edge of the nose portion of the gusset board;

the first panel being moveable between a first position of the first panel relative to the rear surface of the nose portion of the gusset board and a second position of the first panel relative to the rear surface of the nose portion of the gusset board, and the second panel being moveable between a first position of the second panel relative to the rear surface of the nose portion of the gusset board and a second position of the second panel relative to the rear surface of the nose portion of the gusset board, wherein in the first positions of the first panel and the second panel relative to the rear surface of the nose portion of the gusset board the first panel and the second panel extend outwardly from the rear surface of the nose portion of the gusset board and in the second positions of the first panel and the second panel relative to the rear surface of the nose portion of the gusset board the first panel and the second panel extend along the rear surface of the nose portion of the gusset board; and, the mast having a length with opposite proximal and distal ends, the proximal end of the mast being connected to the rear surface of the nose portion of the gusset board at the apex end of the nose sliding surface.

9. The gusset board of claim 8, further comprising:
a pivot connection connecting the proximal end of the mast to the rear surface of the nose portion of the gusset board; and,
an actuator connected between the mast and the rear surface of the nose portion of the gusset board, the actuator being operable to move the mast between the first and second positions of the mast relative to the rear surface of the nose portion of the gusset board.

10. A gusset board configured to fold a gusset in a tube of film, the gusset board comprising:
a base portion of the gusset board;
a base sliding surface on the base portion, the base sliding surface being fixed stationary on the gusset board;
a nose portion of the gusset board;
a nose sliding surface on the nose portion of the gusset board, the nose sliding surface is positioned in substantially a same plane as the base sliding surface, the nose sliding surface having a general triangular configuration with a base edge and an opposite apex end;
the nose portion of the gusset board having a rear surface on an opposite side of the nose portion of the gusset board from the nose sliding surface; and,
a mast having a length with opposite proximal and distal ends, the proximal end of the mast being connected to the rear surface of the nose portion of the gusset board at the apex end of the nose sliding surface, the mast being configured to be moved between a first position of the mast relative to the rear surface of the nose portion of the gusset board and a second position of the mast relative to the rear surface of the gusset board, in the first position of the mast relative to the rear surface of the nose portion of the gusset board the mast extends outwardly from the rear surface and in the second position of the mast relative to the rear surface of the nose portion of the gusset board the mast extends along the rear surface.

11. The gusset board of claim 10, comprising:
a first panel connected between the mast and a first side edge of the nose portion of the gusset board;
a second panel connected between the mast and a second side edge of the nose portion of the gusset board;
the first panel being configured to be moved between a first position of the first panel relative to the rear surface of the nose portion of the gusset board where the first panel extends outwardly from the rear surface of the nose portion of the gusset board in response to the mast being moved to the first position of the mast relative to the rear surface of the nose portion of the gusset board, and a second position of the first panel relative to the rear surface of the nose portion of the gusset board where the first panel extends along the rear surface of the nose portion of the gusset board in response to the mast being moved to the second position of the mast relative to the rear surface of the nose portion of the gusset board; and the second being configured to be moved between a first position of the second panel relative to the rear surface of the nose portion of the gusset board where the second panel extends outwardly from the rear surface of the nose portion of the gusset board in response to the mast being moved to the first position of the mast relative to the rear surface of the nose portion of the gusset board, and a second position of the second panel relative to the rear surface of the nose portion of the gusset board where the second panel extends along the rear surface of the nose portion of the gusset board in response to the mast being moved to the second position of the mast relative to the rear surface of the nose portion of the gusset board.

12. The gusset board of claim 11, further comprising:
the first and the second panel being constructed of flexible material.

13. The gusset board of claim 12, further comprising:
in the first position of the mast relative to the rear surface of the nose portion of the gusset board and in the first positions of the first panel and the second panel relative to the rear surface of the nose portion of the gusset board the mast pulls the first panel and the second panel tight from the respective first side edge and second side edge of the nose portion of the gusset board.

14. The gusset board of claim 10, further comprising:
the nose sliding surface being connected to the base portion of the gusset board for moving between a first position of the nose sliding surface relative to the base portion of the gusset board where the nose sliding surface is positioned in substantially the same plane as the base sliding surface and a second position of the nose sliding surface relative to the base portion of the gusset board where the nose sliding surface is positioned at an angle relative to the base sliding surface.

15. The gusset board of claim 14, further comprising:
the nose sliding surface is connected to the base portion of the gusset board by a pivot connection that enables the nose sliding surface to pivot between the first position of the nose sliding surface relative to the base portion of the gusset board and the second position of the nose sliding surface relative to the base portion of the gusset board.

16. The gusset board of claim 10, further comprising:
the nose sliding surface having a general triangular configuration with a base edge and an opposite apex end; and,
the nose sliding surface being connected to the base portion of the gusset board with the base edge of the nose sliding surface positioned adjacent the base sliding surface.

17. A gusset board configured to fold a gusset in a tube of film, the gusset board comprising:
a base portion of the gusset board;
a base sliding surface on the base portion the base sliding surface being fixed stationary on the gusset board;
a nose portion of the gusset board;
a nose sliding surface on the nose portion of the gusset board, the nose sliding surface being connected to the base portion of the gusset board for movement between a first position of the nose sliding surface relative to the base portion of the gusset board where the nose sliding surface is positioned in substantially a same plane as the base sliding surface and a second position of the nose sliding surface relative to the base portion of the gusset board where the nose sliding surface is positioned away from the plane of the base sliding surface;
the nose portion of the gusset board having a rear surface on an opposite side of the nose portion of the gusset board from the nose sliding surface;
a mast on the rear surface of the nose portion of the gusset board, the mast being configured to be moved between a first position of the mast relative to the rear surface of the nose portion of the gusset board and a second position of the mast relative to the rear surface of the nose portion of the gusset board, in the first position of the mast relative to the rear surface of the nose portion of the gusset board the mast extends outwardly from the rear surface and in the second position of the mast relative to the rear surface of the nose portion of the gusset board the mast extends along the rear surface;
the nose sliding surface having a general triangular configuration with a base edge and an opposite apex end;
the nose sliding surface being connected to the base portion of the gusset board with the base edge of the nose sliding surface positioned adjacent the base sliding surface; and,
the mast having a length with opposite proximal and distal ends, the proximal end of the mast being connected to the rear surface of the nose portion of the gusset board at the apex end of the nose sliding surface.

18. The gusset board of claim 17, further comprising:
a pivot connection connecting the proximal end of the mast to the rear surface of the nose portion of the gusset board; and,
an actuator connected between the mast and the rear surface of the nose portion of the gusset board, the actuator being operable to move the mast between the first and second positions of the mast relative to the rear surface of the nose portion of the gusset board.

* * * * *